(12) United States Patent
Nagasaki et al.

(10) Patent No.: US 11,245,120 B2
(45) Date of Patent: Feb. 8, 2022

(54) FUEL CELL MANUFACTURING METHOD AND PROCESSING DEVICE

(71) Applicant: HONDA MOTOR CO. LTD., Tokyo (JP)

(72) Inventors: Hitoshi Nagasaki, Tochigi (JP); Takehiro Mugishima, Tochigi (JP); Kazuhide Matsuo, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 135 days.

(21) Appl. No.: 16/473,846

(22) PCT Filed: Dec. 26, 2017

(86) PCT No.: PCT/JP2017/046572
§ 371 (c)(1),
(2) Date: Jun. 26, 2019

(87) PCT Pub. No.: WO2018/124039
PCT Pub. Date: Jul. 5, 2018

(65) Prior Publication Data
US 2019/0341628 A1    Nov. 7, 2019

(30) Foreign Application Priority Data
Dec. 28, 2016   (JP) ............................. JP2016-256604

(51) Int. Cl.
*H01M 8/0213*    (2016.01)
(52) U.S. Cl.
CPC ................. *H01M 8/0213* (2013.01)
(58) Field of Classification Search
None
See application file for complete search history.

(56) References Cited

U.S. PATENT DOCUMENTS

2009/0123803 A1    5/2009  Faucheux et al.
2019/0051915 A1*   2/2019  Yonezawa ............. H01M 4/881

FOREIGN PATENT DOCUMENTS

| JP | 2011-204609 A | 10/2011 |
| JP | 2013-115036 A | 6/2013 |
| WO | 2017/047342 A1 | 3/2017 |
| WO | 2017/047343 A1 | 3/2017 |

OTHER PUBLICATIONS

Canadian Office Action dated May 12, 2020, 4 pages.
International Search Report, Application No. PCT/JP2017/046572 dated Apr. 3, 2018, 1 page.

* cited by examiner

*Primary Examiner* — Carmen V Lyles-Irving
(74) *Attorney, Agent, or Firm* — Rankin, Hill & Clark LLP

(57)    ABSTRACT

A fuel cell manufacturing method capable of easily forming an interconnector part electrically connecting adjacent unit cells in a planar array fuel cell is provided. The interconnector part (30) is formed through a local heating process of carbonizing a proton conductive resin by locally heating an electrolyte membrane (12). The local heating process includes: a first heating step of heating a part of the electrolyte membrane (12) to a temperature equal to or less than a first temperature at a first temperature increase rate or less; and a second heating step of heating the part of the electrolyte membrane (12) to a temperature equal to or greater than a second temperature higher than the first temperature at a temperature increase rate greater than the first temperature increase rate, after the first heating step.

4 Claims, 20 Drawing Sheets

FUEL CELL MANUFACTURING METHOD AND PROCESSING DEVICE

TECHNICAL FIELD

The present invention relates to a method of manufacturing a planar array fuel cell having unit cells arranged in a plane and a processing device for forming an interconnector part.

BACKGROUND ART

A fuel cell is a device that obtains electric power from hydrogen and oxygen. The fuel cell has recently attracted attention as a clean power source since the power generation produces only water. Such a fuel cell includes unit cells, each having a low voltage ranging from about 0.6 to 0.8 V. Thus, a currently available fuel cell stack is fabricated by stacking and serially connecting a plurality of unit cells composed of membrane electrode assemblies (MEAs) and separators to obtain high output. This fuel cell stack, however, has a problem that the stacking involves a lot of work steps and thus takes time and effort.

Meanwhile, there is known a fuel cell fabricated by forming a plurality of unit cells in a plane on a sheet of electrolyte membrane, forming an interconnector part for connecting adjacent unit cells, and connecting the plurality of unit cells in series (for example, see Patent Literature 1). Such a configuration has advantages capable of increasing the voltage with one sheet of electrolyte membrane and eliminating the need to stack the unit cells.

CITATION LIST

Patent Literature

Patent Literature 1: Japanese Patent Laid-Open No. 2011-204609

SUMMARY OF INVENTION

Technical Problem

In such a fuel cell disclosed in Patent Literature 1, a void portion is formed in a part of the electrolyte membrane, and the interconnector part is formed by filling the void portion with an anode catalyst layer material or a cathode catalyst layer material. However, such a configuration has a problem that the formation of the interconnector part requires several steps that take time and effort.

In view of the above conventional problem, the present invention has been made, and an object of the present invention is to provide a fuel cell manufacturing method capable of easily forming an interconnector part electrically connecting adjacent unit cells in a planar array fuel cell and a processing device for forming the interconnector part.

Solution to Problem

In order to solve the above problem, a fuel cell manufacturing method of the present invention is a method of manufacturing a fuel cell comprising an electrode layer on two surfaces of an electrolyte membrane made of a proton conductive resin, wherein the electrode layer on the two surfaces includes a plurality of electrode regions divided by a dividing groove; and a unit cell is constituted by a stacked structure including one electrode region on one surface side of the two surfaces, one electrode region on the other surface side facing the one electrode region, and the electrolyte membrane;

a plurality of the unit cells are arranged;

the electrolyte membrane includes therein an interconnector part electrically connecting the electrode region on the one surface side of one of the unit cells and the electrode region on the other surface side of a unit cell arranged adjacent to the one of the unit cells; and the interconnector part is made of a conductive carbide derived from the proton conductive resin of the electrolyte membrane, wherein the interconnector part is formed through a local heating process of carbonizing the proton conductive resin by locally heating the electrolyte membrane; and the local heating process comprises: a first heating step of heating a part of the electrolyte membrane after the first heating step, to a temperature equal to or less than a first temperature at a first temperature increase rate or less; and a second heating step of heating the part of the electrolyte membrane to a temperature equal to or greater than a second temperature higher than the first temperature at a temperature increase rate greater than the first temperature increase rate.

According to the fuel cell manufacturing method of the present invention, the first and second heating steps allow the interconnector part to be made of a conductive carbide derived from the proton conductive resin of the electrolyte membrane and thereby to be easily formed without the need for a complicated process. This is because the conductive carbide, namely, the interconnector part can be obtained only by carbonizing a part of the electrolyte membrane. Further, the two heating steps allow an excellent interconnector part to be reliably formed.

Meanwhile, a processing device of the present invention is a processing device forming an interconnector part of a fuel cell comprising an electrode layer on two surfaces of an electrolyte membrane made of a proton conductive resin, wherein the electrode layer on the two surfaces includes a plurality of electrode regions divided by a dividing groove; a unit cell is constituted by a stacked structure including one electrode region on one surface side of the two surfaces, one electrode region on the other surface side facing the one electrode region, and the electrolyte membrane, wherein a plurality of the unit cells are arranged; the electrolyte membrane includes therein an interconnector part electrically connecting the electrode region on the one surface side of one of the unit cells and the electrode region on the other surface side of a unit cell arranged adjacent to the one of the unit cells; and the interconnector part is made of a conductive carbide derived from the proton conductive resin of the electrolyte membrane, the processing device comprising a processing head relatively moving along a main surface of the electrolyte membrane, wherein the processing head comprises: a first laser beam irradiation head configured to heat a part of the electrolyte membrane to a temperature equal to or less than a first temperature at a first temperature increase rate or less by laser beam irradiation; and a second laser beam irradiation head configured to heat the part of the electrolyte membrane to a temperature equal to or greater than a second temperature higher than the first temperature at a temperature increase rate greater than the first temperature increase rate by laser beam irradiation.

According to the processing device of the present invention, the first and second laser beam irradiation heads allow the interconnector part to be formed only by locally heating a part of the electrolyte membrane of the proton conductive resin and carbonizing the proton conductive resin of that part to form a conductive carbide, whereby the interconnector part can be formed in an easy and reliable manner without the need for a complicated process.

The proton conductive resin is preferably an aromatic polymer compound obtained by introducing sulfonic acid groups into hydrocarbon polymers such as aromatic polyarylene ether ketones and aromatic polyarylene ether sulfones. Such a compound is easily changed to a conductive carbide by heating.

Advantageous Effects of Invention

The present invention can provide a fuel cell manufacturing method capable of easily forming an interconnector part electrically connecting adjacent unit cells in a planar array fuel cell.

DESCRIPTION OF EMBODIMENTS

Hereinafter, an embodiment of the present invention will be described further in detail with reference to the accompanying drawings.

Fuel Cell

Figure 1:
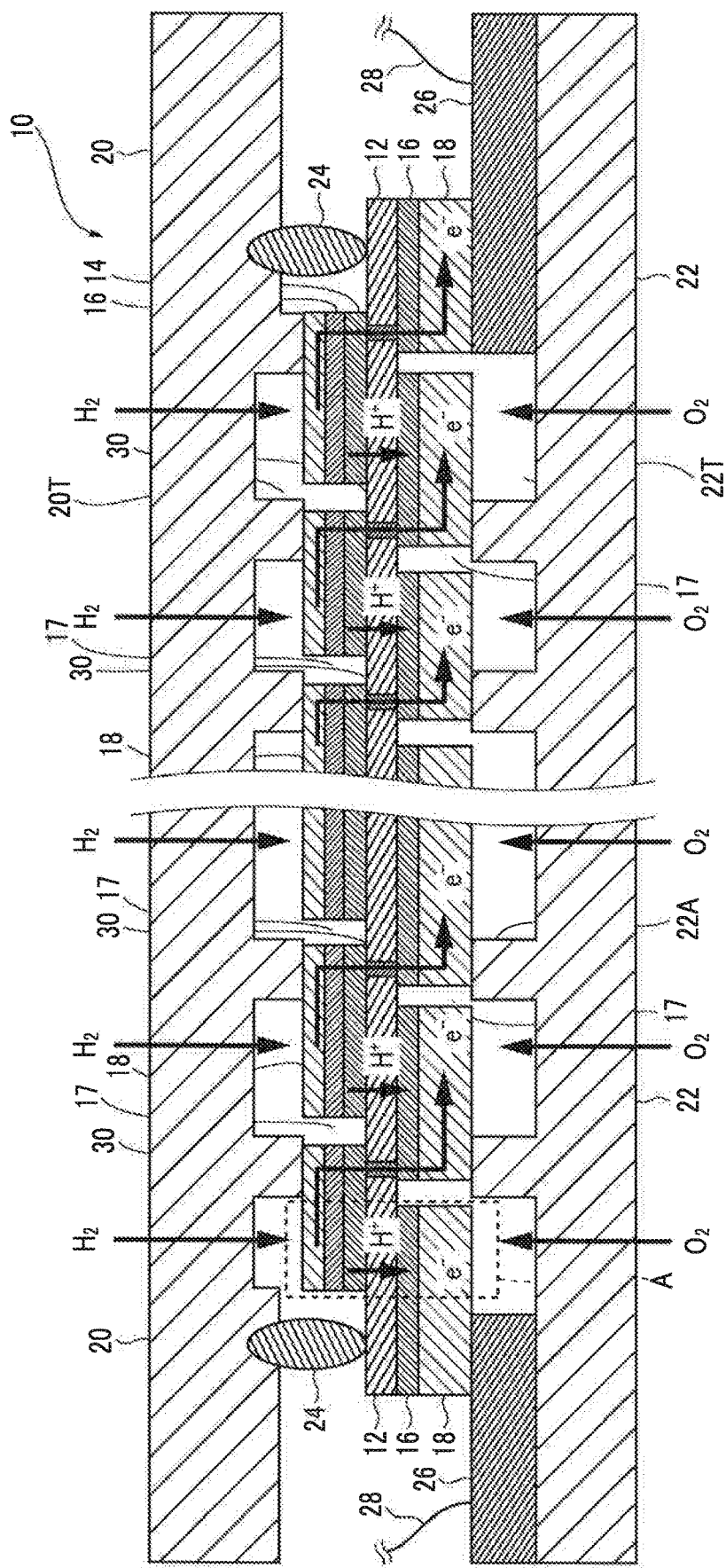
FIG. 1 is a schematic sectional view illustrating an embodiment of a fuel cell to which the present invention is applied.
Figure 2:
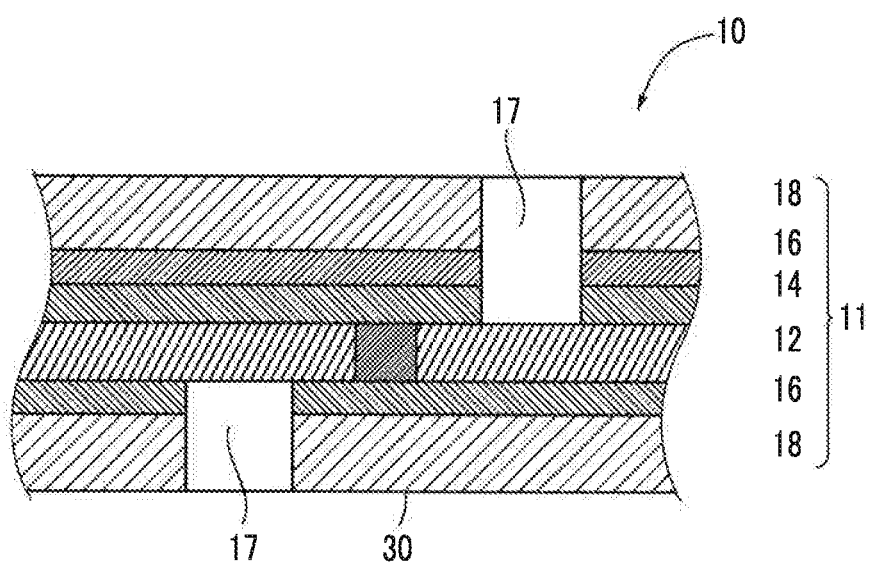
FIG. 2 is an enlarged sectional view illustrating an essential part of the cell illustrated in FIG. 1.

FIG. 1 is a schematic sectional view illustrating an embodiment of a fuel cell to which the present invention is applied. FIG. 2 is an enlarged view of an essential part in FIG. 1, in which the upper side is an anode and the lower side is a cathode. FIG. 2 illustrates a fuel cell 10 which has a membrane electrode assembly (MEA) 11 which includes a gas diffusion layer 18 on the two surface sides of an electrolyte membrane 12 (PEM: polymer electrolyte membrane). The upper side of the membrane electrode assembly 11 includes a gas diffusion layer 18 and an electrode layer including a catalyst layer 16 and a protection layer 14 contacting the electrolyte membrane 12. The lower side of the membrane electrode assembly 11 includes a catalyst layer 16 as the electrode layer and a gas diffusion layer 18. In other words, in the present embodiment, the electrode layer on the upper side includes two layers: the catalyst layer 16 and the protection layer 14. Further, an upper plate 20 is disposed above the gas diffusion layer 18 on the upper side, and a lower plate 22 is disposed under the gas diffusion layer 18 on the lower side. Both the upper plate 20 and the lower plate 22 are configured to sandwich the membrane electrode assembly 11. Note that FIG. 1 omits the stacked structure located in the center.

A plurality of flow channel grooves 20T and 22T (concave portions in the drawing) for hydrogen gas and oxygen-containing gas (air) are provided facing each other on the surfaces of the gas diffusion layers 18 of the upper plate 20 and the lower plate 22 respectively. Seals 24 are disposed between the upper plate 20 and a peripheral portion on the upper surface (anode side) of the electrolyte membrane 12. The seals 24 contact the electrolyte membrane 12 and the upper plate 20 to seal the space between the upper plate 20 and the electrolyte membrane 12. Note that the upper plate 20 includes an unillustrated hydrogen inlet for introducing hydrogen supplied from an unillustrated hydrogen supply unit into between the upper plate 20 and the electrolyte membrane 12. Meanwhile, the lower surface (cathode side)

of the electrolyte membrane 12 is structured to take in oxygen from surrounding air without being sealed unlike the upper surface.

Further, on the lower surface (cathode side) of the electrolyte membrane 12, graphite sheets 26 are disposed between the lower plate 22 and the gas diffusion layer 18 on the lower surface of the two end portions (left end and right end in FIG. 1) of the membrane electrode assembly 11, and the graphite sheets 26 are configured to contact the gas diffusion layer 18. A conducting wire 28 is connected to each graphite sheet 26, and power generated by the fuel cell 10 is extracted to the outside through the conducting wire 28. Note that the electrolyte membrane 12, the catalyst layer 16 and the gas diffusion layer 18 on the lower surface side thereof are pressed with a certain pressure (for example, 2 MPa or less) and sandwiched between the upper plate 20 and the lower plate 22.

The protection layer 14, the catalyst layer 16, and the gas diffusion layer 18 on the upper surface side of the electrolyte membrane 12 as well as the catalyst layer 16 and the gas diffusion layer 18 on the lower surface side of the electrolyte membrane 12 are divided into a plurality of regions (hereinafter referred to as "electrode regions") by a plurality of dividing grooves 17. Each electrode region has a rectangular shape having a long side in the extending direction of the dividing groove 17 and a short side between the two dividing grooves 17. Further, the electrode regions on the upper surface side of the electrolyte membrane 12 are arranged facing the electrode regions on the lower surface side thereof.

In the membrane electrode assembly 11, a unit cell (power generation cell) is constituted by a stacked structure including one electrode region on the upper surface side of the electrolyte membrane 12, another electrode region on the lower surface side facing a part of the electrode region, and the electrolyte membrane 12 located between the two electrode regions. More specifically, in FIG. 1, the unit cell refers to a stacked structure including the electrolyte membrane 12, and the protection layer 14, the catalyst layer 16, and the gas diffusion layer 18 on the upper surface side thereof as well as the catalyst layer 16 and the gas diffusion layer 18 on the lower surface side thereof. In FIG. 1, only the leftmost unit cell is illustrated by a broken line A.

The electrolyte membrane 12 includes therein an interconnector part 30 electrically connecting an electrode region on the upper surface side of one unit cell and an electrode region on the lower surface side of a unit cell adjacent to the one unit cell. The interconnector part 30 electrically connects the adjacent unit cells in series.

In FIGS. 1 and 2, the width (distance between the two dividing grooves 17) of each electrode region can be, for example, about 5 mm, and the width of the interconnector part 30 may be about 0.1 mm.

In the above described configuration, hydrogen gas is supplied to the anode side and oxygen-containing gas (air) is supplied to the cathode side, causing each unit cell to generate power. Then, the power can be extracted through the conducting wires 28 connected to the two graphite sheets 26. Since each unit cell is connected in series, the voltage of the fuel cell 10 is the sum of the voltage of each unit cell.

The components of the fuel cell 10 will be described in detail below.

Electrolyte Membrane

The electrolyte membrane 12 in the fuel cell 10 of the present invention is not particularly limited, and various electrolyte membranes may be adopted. As described above, the electrolyte membrane 12 includes therein an interconnector part 30 electrically connecting adjacent unit cells in series. The interconnector part 30 is formed by locally heating and carbonizing a part of the electrolyte membrane 12 as described later.

The proton conductive resin of the electrolyte membrane 12 is preferably an aromatic polymer compound obtained by introducing sulfonic acid groups into hydrocarbon polymers such as aromatic polyarylene ether ketones and aromatic polyarylene ether sulfones. The reason for this is that the interconnector part 30 can be formed by carbonizing an aromatic polymer compound more easily than a perfluorosulfonic acid resin such as Nafion (registered trademark). Although the reason is unknown, it can be considered that an aromatic polymer includes a six-membered ring structure of carbon atoms in the molecular structure, and thus can be easily graphitized by pyrolysis. Such an aromatic polymer changes to a carbide having conductivity, for example, by heating at about 900° C.

Catalyst Layer

The catalyst layer 16 is configured to include, for example, carbon particles (catalyst particles) carrying a catalyst metal, Examples of the carbon particles may include not only carbon black but also graphite, carbon fiber, activated carbon, etc., and pulverized products thereof, as well as carbon compounds such as carbon nanofibers and carbon nanotubes. Meanwhile, as the catalyst metal, metals such as platinum, ruthenium, iridium, rhodium, palladium, osmium, tungsten, lead, iron, chromium, cobalt, nickel, manganese, vanadium, molybdenum, gallium, and aluminum can be used alone or in combination of two or more thereof.

The catalyst layer 16 includes not only the catalyst particles but also a proton conductive resin. The catalyst layer 16 has a porous structure to increase the contact area with hydrogen gas or oxygen-containing gas. Therefore, the filling density of the proton conductive resin is set to be less than that of the protection layer 14 to be described later. For example, the proton conductive resin in the catalyst layer 16 may be 30 to 50 wt %.

Protection Layer

In order to prevent so-called cross leaks representing that gas leaks in the electrolyte membrane 12 or in the interconnector part 30 in the electrolyte membrane 12 or in the vicinity thereof, the protection layer 14 is preferably disposed on one surface side of the electrolyte membrane 12 or on the two surface sides thereof. In FIG. 1, the protection layer 14 is disposed on the upper surface side of the electrolyte membrane 12.

The protection layer 14 may have any properties as long as the properties can prevent cross leaks, but the protection layer 14 may preferably have gas barrier properties and may further have electrical conductivity and proton conductivity.

The protection layer 14 may be made of a proton conductive resin and a conductive carbon (carbon). To enhance the gas barrier properties, the filling density of the proton conductive resin is set to be higher than that of the catalyst layer 16. For example, the proton conductive resin in the protection layer 14 may be equal to or greater than 70 wt %. Note that the proton conductive resin may be made of the same material as or a different material from the catalyst layer 16.

Examples of the proton conductive resin may include perfluorosulfonic acid resin such as Nafion (registered trademark) and the above described aromatic polymer compound.

Examples of the conductive carbon include carbon black, acetylene black, ketjen black, and the like.

The above described protection layer 14 can be formed, for example, by applying and drying a coating solution prepared by adding a conductive carbon such as ketjen black to a dispersion solution of a proton conductive resin such as Nafion (registered trademark). Note that the thickness of the protection layer 14 may be, for example, 5 to 50 μm.

Gas Diffusion Layer

The gas diffusion layer 18 is constituted by stacking a base material and a porous layer. Carbon paper or carbon cloth may be used as the base material.

Upper Plate and Lower Plate

As described above, the upper plate 20 and the lower plate 22 comprise the gas flow channel grooves 20T and 22T (concave portions) respectively on the gas diffusion layer 18 side. The gas diffusion layer 18 is pressed by the portions between the flow channel grooves 20T and 20T and the portions (convex portions) between the flow channel grooves 22T and 22T. Since the unit cells in the membrane electrode assembly 11 are connected in series through the interconnector part 30, the upper plate 20 and the lower plate 22 are preferably made of an insulating resin. Examples of the general purpose resin may include a polypropylene resin (PP), a polyphenylene sulfide resin (PPS), and the like.

Fuel Cell Manufacturing Method

The fuel cell 10 can be manufactured by the following manufacturing method of the present invention to be described below.

Figure 3:
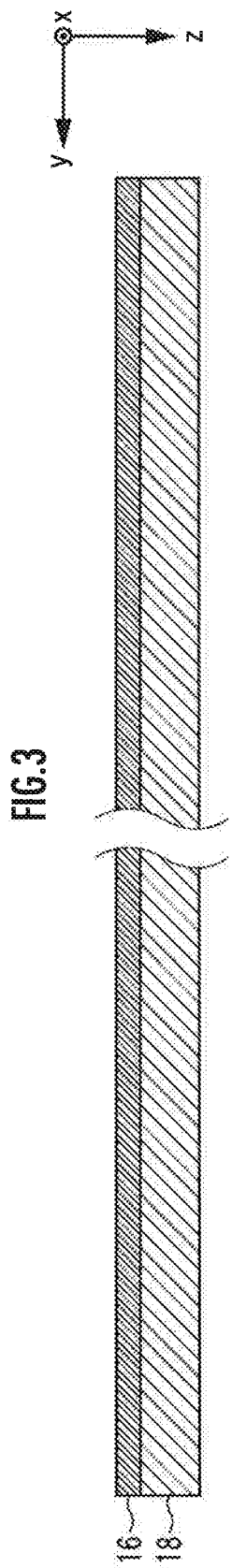
FIG. 3 is a schematic sectional view illustrating a part of the fuel cell for describing the fuel cell manufacturing method of the present invention.

First, carbon paper is prepared as the material of the gas diffusion layer 18. Then, ink containing a catalyst and a proton conductive resin is applied to one surface of the gas diffusion layer 18 of this carbon paper to form the catalyst layer 16. As a result, as illustrated in FIG. 3, an electrode layer made of the catalyst layer 16 is formed on the gas diffusion layer 18. Note that the present manufacturing method assumes that as illustrated in FIG. 3, one surface of the carbon paper (gas diffusion layer) 18 is located on a plane in the xy direction of the Cartesian coordinates and ink is applied to the catalyst layer 16 in the z direction from the one surface.

Figure 4:
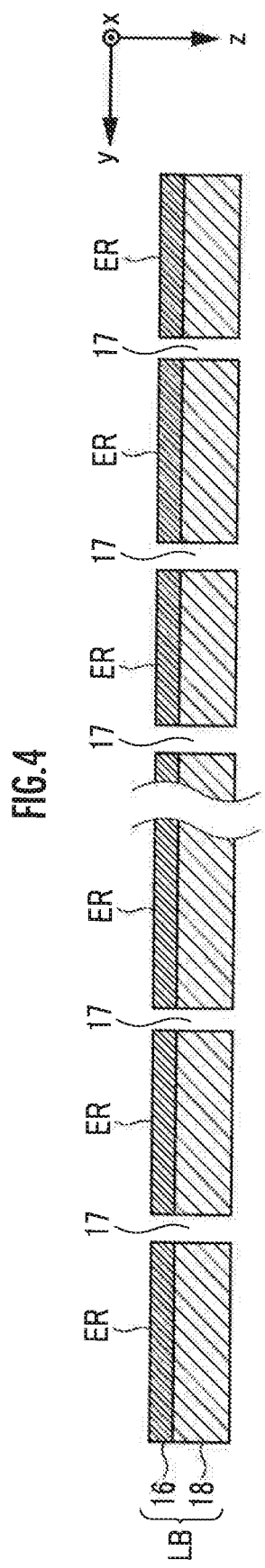
FIG. 4 is a schematic sectional view illustrating a part of the fuel cell for describing the fuel cell manufacturing method of the present invention.

Then, as illustrated in FIG. 4, a plurality of dividing grooves 17 each having a predetermined length are linearly formed in the x direction in a laminate LB (hereinafter referred to as "a diffusion electrode laminate") made of the thus formed gas diffusion layer 18 and electrode layer, thereby to partition the diffusion electrode laminate LB into a plurality of electrode regions ER. Examples of the method of forming the dividing grooves may include a method of mechanically removing the portion of the diffusion electrode laminate LB using a needle-shaped cutting tool and a method of irradiating the portion with a laser beam and evaporating the portion.

Figure 5:
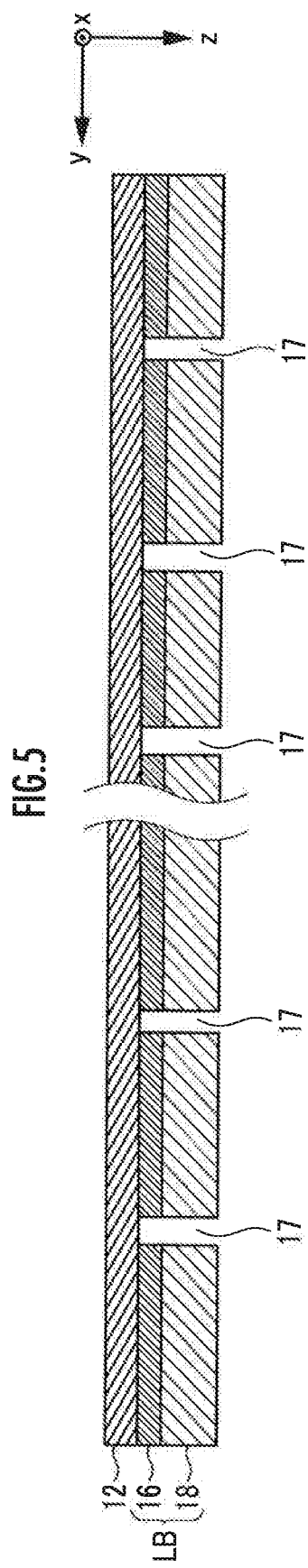
FIG. 5 is a schematic sectional view illustrating a part of the fuel cell for describing the fuel cell manufacturing method of the present invention.

Then, as illustrated in FIG. 5, the electrolyte membrane 12 is placed on the catalyst layer 16 of the diffusion electrode laminate LB having the dividing grooves 17 formed therein.

Figure 6:
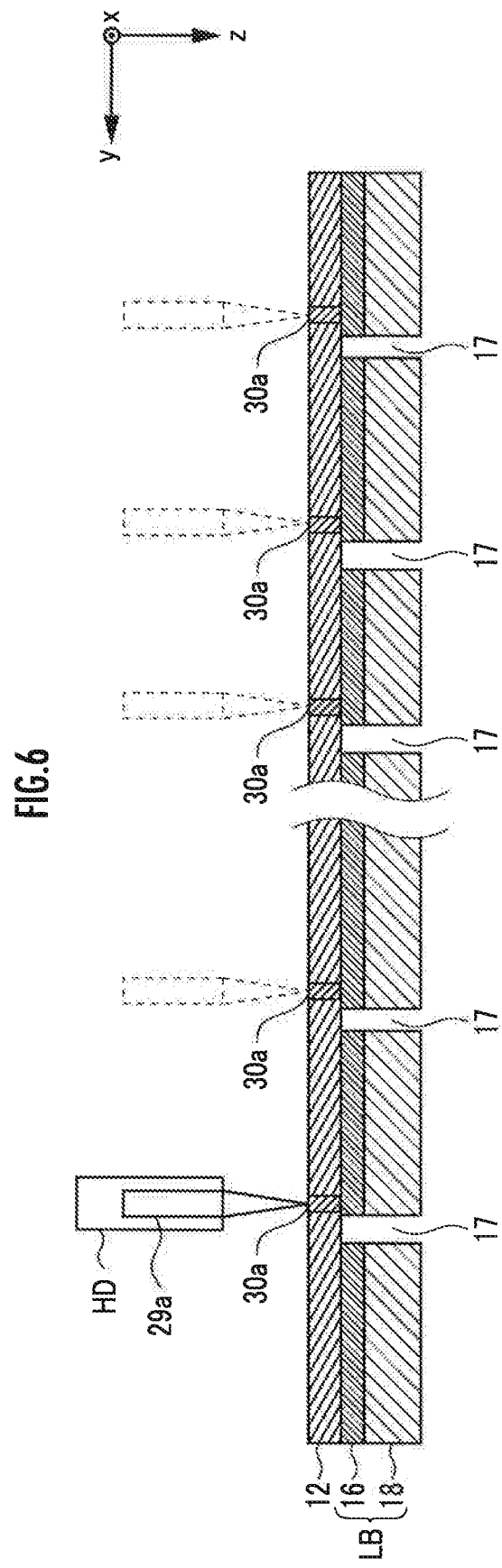
FIG. 6 is a schematic sectional view illustrating a part of the fuel cell for describing the fuel cell manufacturing method of the present invention.

Then, as illustrated in FIG. 6, each planned formation portion 30a of the interconnector part 30 of the electrolyte membrane 12 is locally heated by a heating unit (a first local heating step). As the heating unit, the laser beam irradiation processing head which linearly moves relatively in the x direction along the main surface of the electrolyte membrane 12 is used. Examples of the laser light source may include $CO_2$ laser. The laser beam irradiation processing head HD comprises a first laser beam irradiation head 29a, and heats each part 30a of the electrolyte membrane 12 to a temperature equal to or less than a first temperature at a first temperature increase rate or less by laser beam irradiation by the first laser beam irradiation head 29a. In the first local heating step, the temperature of the part of the electrolyte membrane 12 is increased to a non-carbonizing temperature (for example, about 400° C.), for example, using a $CO_2$ laser. The moisture in the electrolyte membrane 12 of the part 30a to become the interconnector part 30 can be sufficiently removed by increasing the temperature to 400° C. (a first temperature). Note that in order to prevent rapid evaporation of moisture, the first temperature increase rate is preferably 3° C./msec or less.

Figure 7:
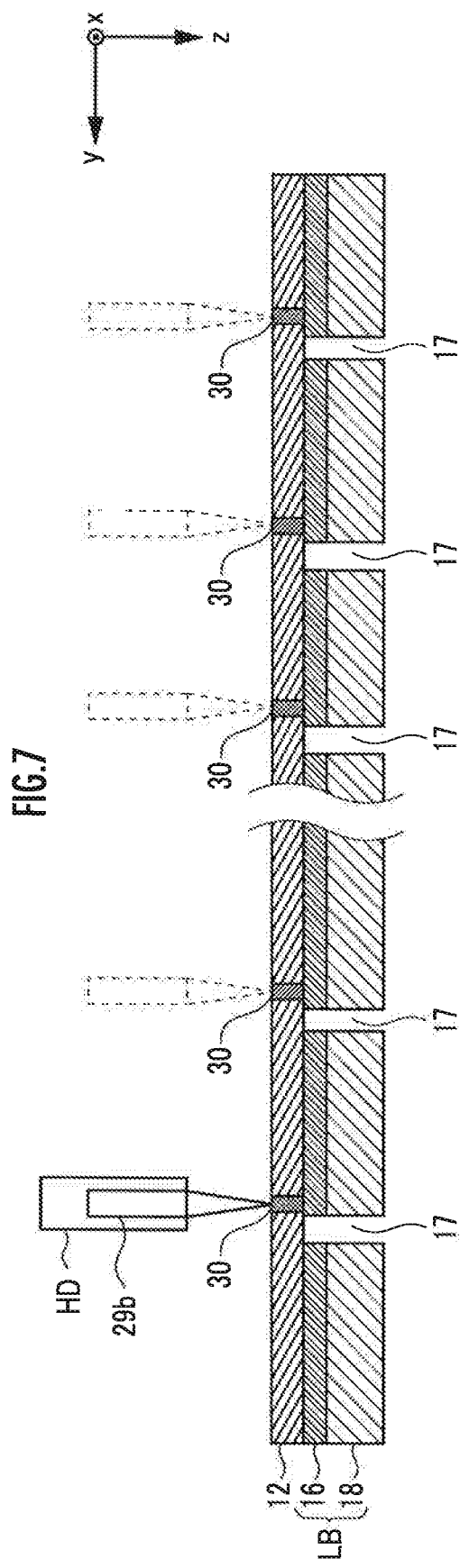
FIG. 7 is a schematic sectional view illustrating a part of the fuel cell for describing the fuel cell manufacturing method of the present invention.

Then, as illustrated in FIG. 7, after the first local heating step, the part (30a in FIG. 6) of the electrolyte membrane 12 is locally heated and carbonized again by the heating unit to form the interconnector part 30 (a second local heating step). The laser beam irradiation processing head HD further comprises a second laser beam irradiation head 29b, and heats the part of the electrolyte membrane 12 to a temperature equal to or greater than a second temperature (for example, about 900° C.) higher than the first temperature at a second temperature increase rate greater than the first temperature increase rate (for example, 3° C./msec) by laser beam irradiation by the second laser beam irradiation head 29b. Thus, the interconnector part 30 can be formed without increasing the thickness by performing the first and second local heating steps on the same part, thereby to locally remove moisture and then to carbonize the part.

It should be noted that it is found that in order to carbonize a part of the electrolyte membrane 12, when the electrolyte membrane 12 is irradiated with a laser beam having a high output irradiation intensity to heat the electrolyte membrane 12 to a temperature equal to or greater than 900° C. by using only the second local heating step without using the first local heating step, the moisture retained by the electrolyte membrane 12 is rapidly evaporated and thus carbonization occurs in a foamed state, leading to an increase in thickness volume) of the part. The increase in thickness causes an insufficient contact between the catalyst layer 16 and the interconnector part 30 and deteriorates the performance. As a result of intensive research, the inventors of the present invention have found that the interconnector part 30 can be formed without increasing the thickness by first irradiating the electrolyte membrane 12 with a low intensity laser beam to evaporate moister therein and then irradiating the electrolyte membrane 12 with a high intensity laser beam to promote carbonization.

Figure 8:
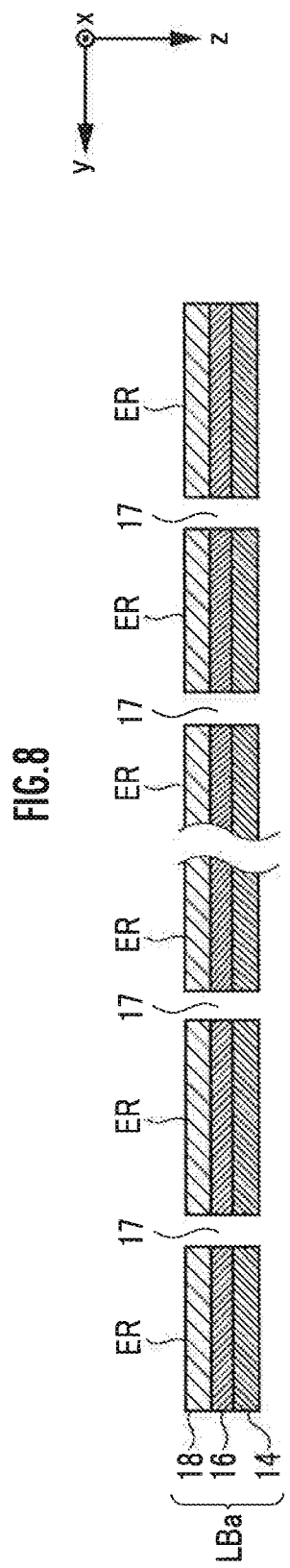
FIG. 8 is a schematic sectional view illustrating a part of the fuel cell for describing the fuel cell manufacturing method of the present invention.

Then, as illustrated in FIG. 8, another diffusion electrode laminate LBa is prepared. The other diffusion electrode laminate LBa is formed such that the catalyst layer 16 and the protection layer 14 as the electrode layer are formed on the gas diffusion layer 18 and a plurality of dividing grooves 17 each having a predetermined length are linearly formed in the x direction, thereby to partition the diffusion electrode laminate LBa into a plurality of electrode regions ER. The protection layer 14 is formed by applying ink containing a conductive material (such as ketjen black) and a proton conductive resin to the catalyst layer 16. Examples of the method of forming the dividing grooves 17 may include a method of mechanically removing the portion of the diffusion electrode laminate LBa using a needle-shaped cutting tool and a method of irradiating the portion with a laser beam and evaporating the portion.

Figure 9:
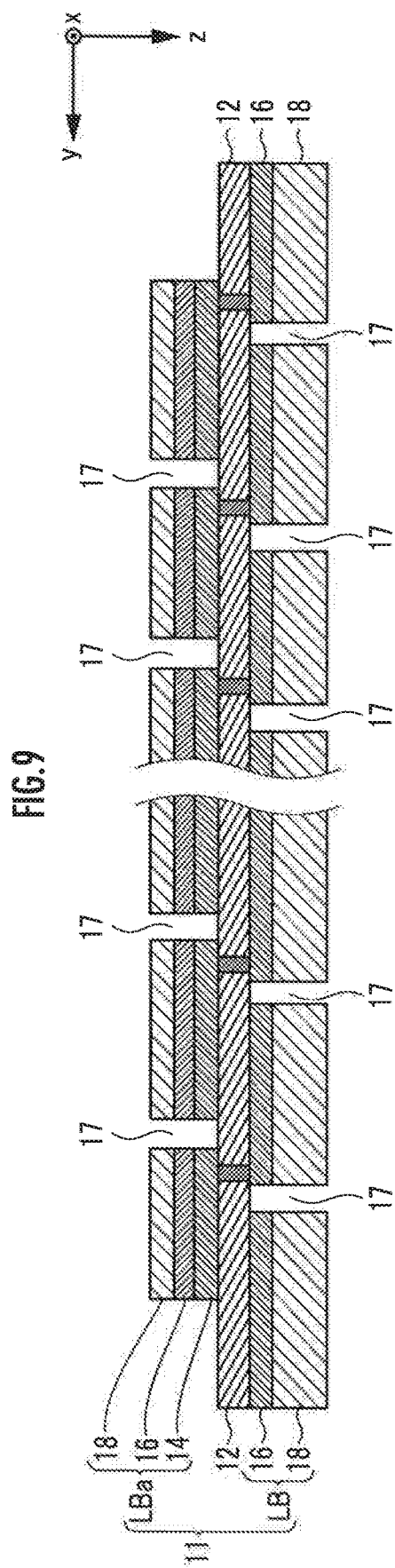
FIG. 9 is a schematic sectional view illustrating a part of the fuel cell for describing the fuel cell manufacturing method of the present invention.

Then, as illustrated in FIG. 9, a still another diffusion electrode laminate LBa is placed on a surface side opposite to the diffusion electrode laminate LB of the electrolyte membrane 12 having the interconnector part 30 formed in the above described manner so that its electrode layer faces the electrolyte membrane 12 side. The other diffusion electrode laminate LBa also has the dividing grooves 17 formed before placement, and is placed by positioning so that each of the dividing grooves 17 is positioned at a predetermined position relative to the interconnector part 30 (that is, so that the interconnector part 30 is covered with the electrode region of the diffusion electrode laminate LB).

As described above, the diffusion electrode laminate LB, the electrolyte membrane 12, and the other diffusion electrode laminate LBa are overlapped and hot-pressed in the stacking direction for integration to manufacture the membrane electrode assembly 11. Thus, the adjacent unit cells are electrically connected in series via the interconnector part 30.

Figure 10:
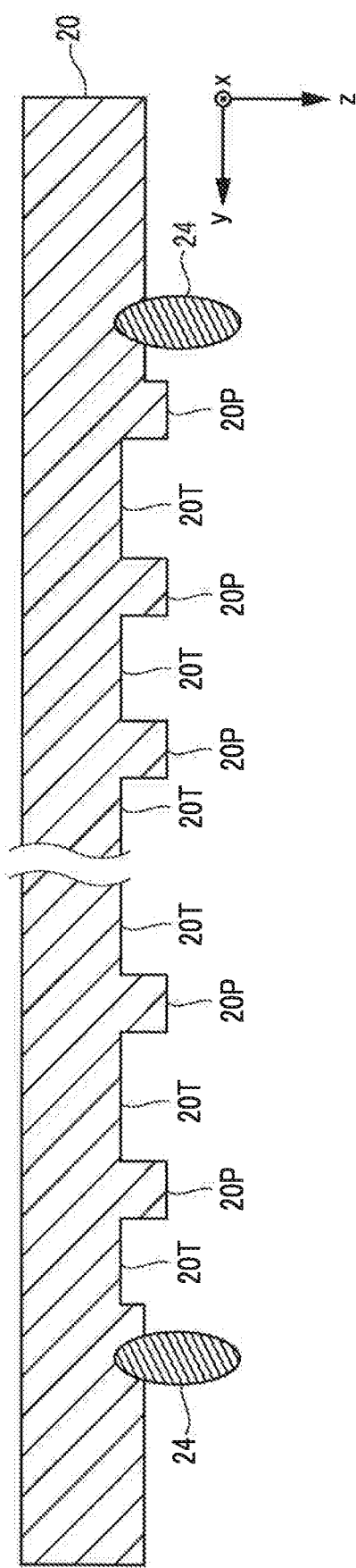
FIG. 10 is a schematic sectional view illustrating a part of the fuel cell for describing the fuel cell manufacturing method of the present invention.

Then, as illustrated in FIG. 10, the upper plate 20 is prepared. The surface of the upper plate 20 facing the gas diffusion layer on the anode side of the membrane electrode assembly 11 includes therein a plurality of flow channel grooves 20T and convex portions 20P between adjacent grooves linearly arranged in parallel in the x direction to introduce hydrogen gas. The convex portions 20P press the gas diffusion layer 18 on the anode side of the membrane electrode assembly 11 at assembly completion. Further, the seals 24 are provided so as to surround the area of the upper plate 20 in which the plurality of convex portions 20P are located. The top surface of each of the seals 24 contacts the membrane electrode assembly 11 at assembly completion to seal the space between the upper plate 20 and the membrane electrode assembly 11 in which the flow channel grooves 20T and the convex portions 20P are located.

Figure 11:
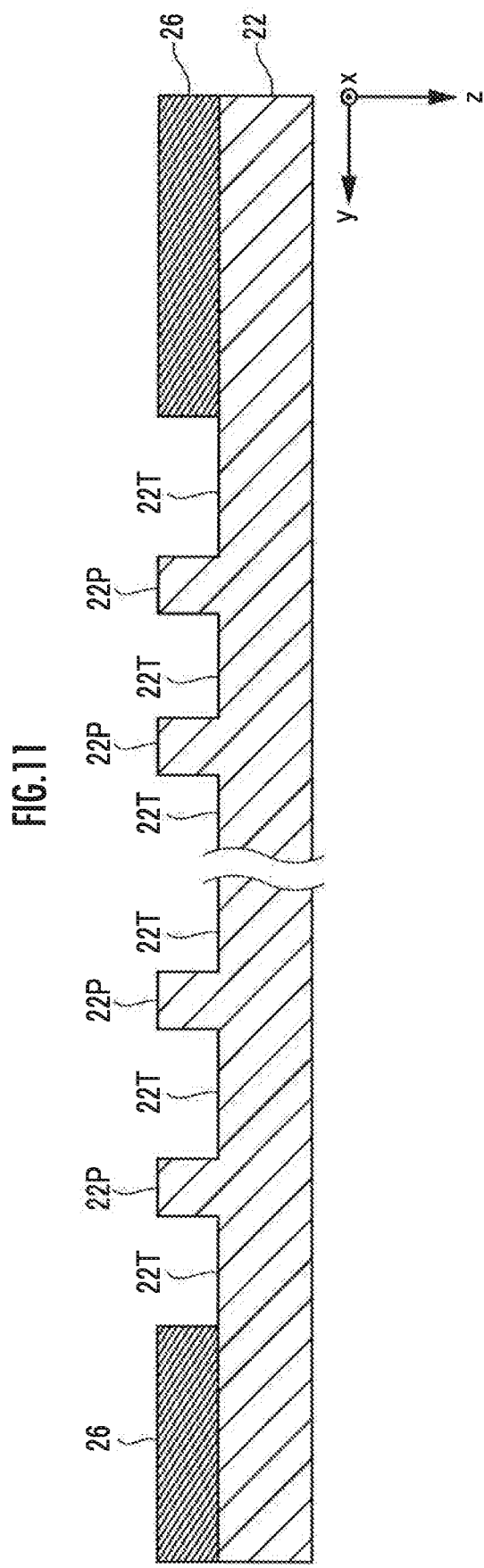
FIG. 11 is a schematic sectional view illustrating a part of the fuel cell for describing the fuel cell manufacturing method of the present invention.

Then, as illustrated in FIG. 11, the lower plate 22 is prepared. The surface of the lower plate 22 facing the gas diffusion layer on the cathode side of the membrane electrode assembly 11 includes therein a plurality of flow channel grooves 22T and convex portions 22P between each pair of the flow channel grooves 22T and 22T arranged linearly in parallel in the x direction to introduce oxygen-containing gas (air). The convex portions 22P press the gas diffusion layer 18 on the cathode side of the membrane electrode assembly 11 at assembly completion. Further, the graphite sheet 26 is provided in advance in each of the two end portions of the lower plate 22.

Then, as illustrated in FIG. 1 again, the upper plate 20 and the lower plate 22 press and sandwich the electrolyte membrane 12, the protection layer 14, catalyst layer 16, and the gas diffusion layer 18 with a constant pressure so that the convex portions of the upper plate 20 and the lower plate 22 sandwich the interconnector parts 30 of the membrane electrode assembly 11. Thus, the pair of graphite sheets 26 are electrically connected to the gas diffusion layer 18 on the cathode side of the membrane electrode assembly 11. Then, the conducting wire 28 is connected to each of the graphite sheets 26 to complete the assembly.

Figure 12:
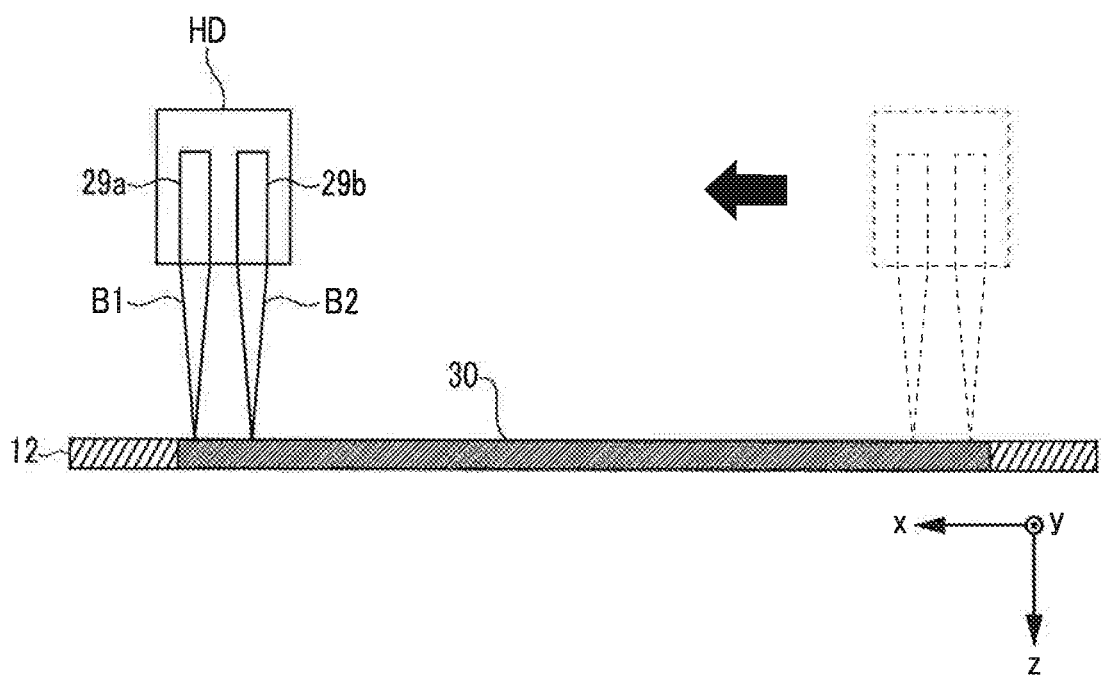
FIG. 12 is a schematic sectional view illustrating a part of the fuel cell for describing the fuel cell manufacturing method of the present invention.
Figure 13:
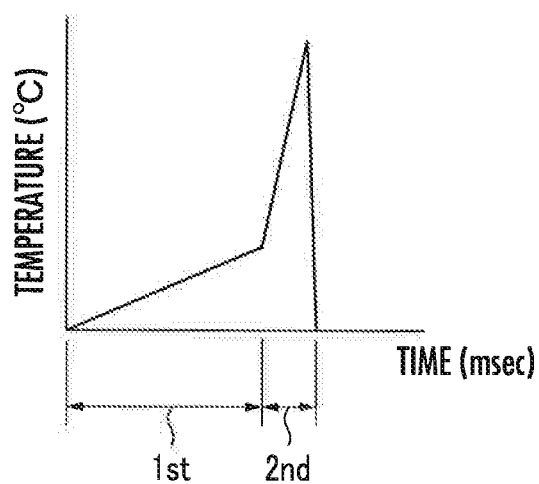
FIG. 13 is a graph illustrating an example of a temperature profile obtained by local heating of an electrolyte membrane according to the fuel cell manufacturing method of the present invention.

In the above described first and second local heating steps (FIGS. 6 and 7), as illustrated in FIG. 12, the laser beam irradiation processing head HD comprising the first laser beam irradiation head 29a having a low output irradiation intensity and the second laser beam irradiation head 29b having a higher output irradiation intensity than that of the first laser beam irradiation head 29a is linearly moved in the x direction so that the two laser beams B1 and B2 draw the same locus, thereby perform laser beam irradiation for each of the dividing grooves 17 to form a temperature profile as illustrated in FIG. 13. In the temperature profile, in the first local heating step 1st, a part of the electrolyte membrane 12 is heated to a temperature equal to or less than 400° C. at the first temperature increase rate and in the second local heating step 2nd, the part is heated to a temperature of 900° C. at the second temperature increase rate greater than the first temperature increase rate.

Figure 14:
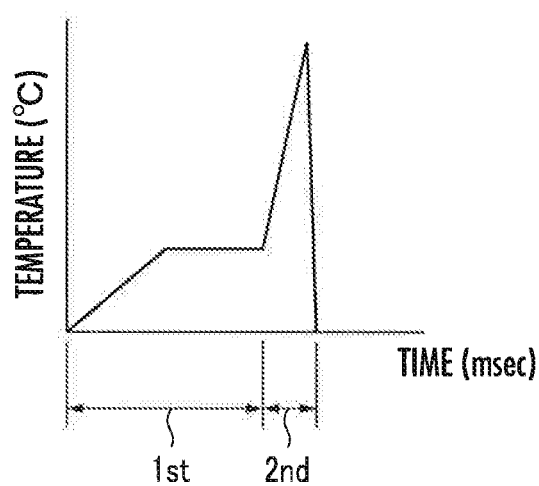
FIG. 14 is a graph illustrating another example of a temperature profile obtained by local heating of an electrolyte membrane according to the fuel cell manufacturing method of the present invention.

Another example of a modification for heating may include a method of performing laser beam irradiation so as to obtain a constant temperature in the first local heating step 1st like the temperature profile as illustrated in FIG. 14 by controlling the output irradiation intensity of the first laser beam irradiation head 29a since it is enough to sufficiently remove moisture in the local portion of the electrolyte membrane 12. At this time, the temperature increase rate for heating the temperature up to the above described constant temperature should be the first temperature increase rate or less.

Figure 15:
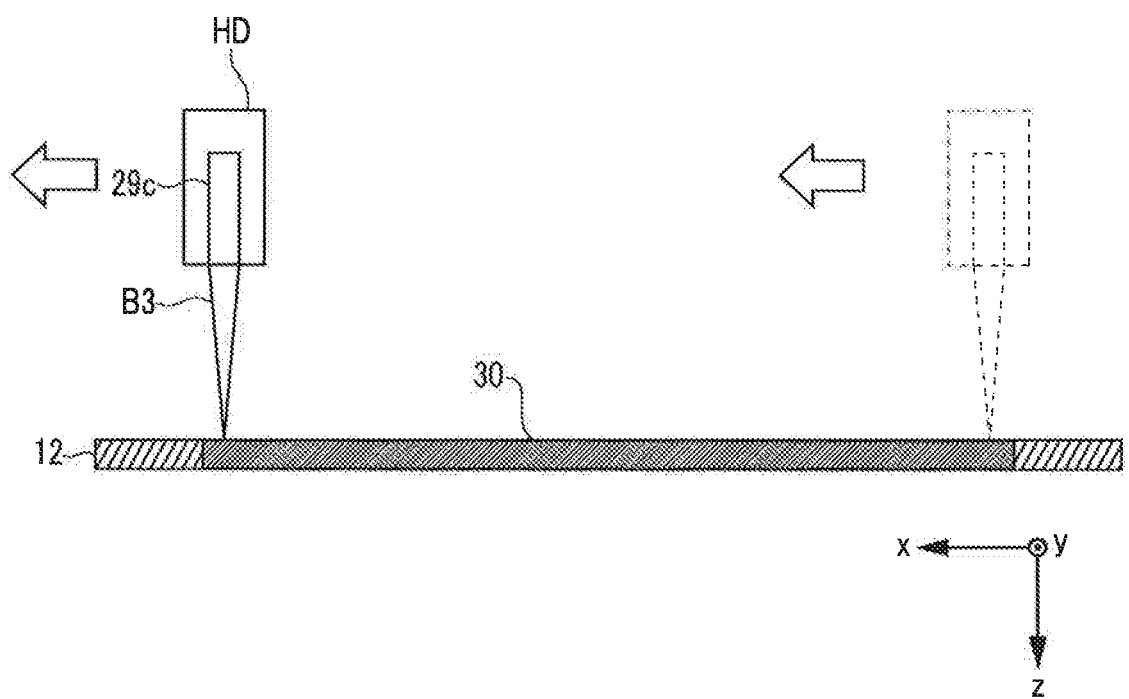
FIG. 15 is a schematic sectional view illustrating a part of the fuel cell for describing another example of the fuel cell manufacturing method of the present invention.
Figure 16:
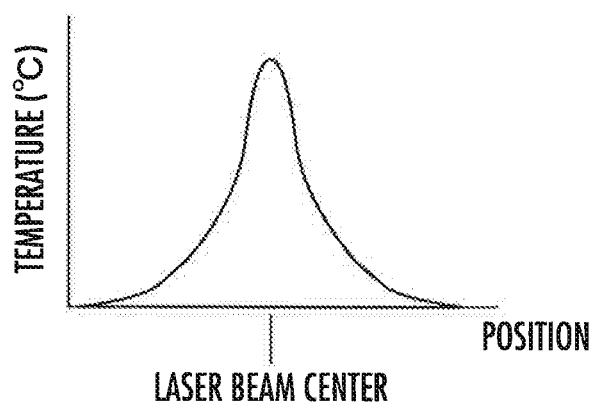
FIG. 16 is a graph illustrating an example of a temperature profile obtained by increase in temperature of the electrolyte membrane and a temperature profile obtained by heating by heat conduction of the electrolyte membrane at an irradiation position relative to a laser beam optical axis in the other example of the fuel cell manufacturing method of the present invention.
Figure 17:
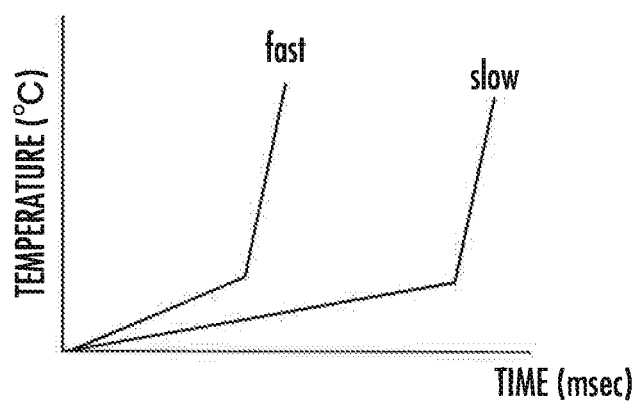
FIG. 17 is a graph illustrating another example of a temperature profile obtained by local heating of the electrolyte membrane in the other example of the fuel cell manufacturing method of the present invention.

Further, another method may be configured to implement the first and second local heating steps by performing laser beam irradiation once but not twice as described above. For example, as illustrated in FIG. 15, the laser beam irradiation processing head HD comprising only a single laser beam irradiation head 29c is linearly moved in the x direction and the electrolyte membrane 12 is irradiated with a laser beam B3 to perform two-stage heating by controlling the output irradiation intensity and the moving speed of the laser beam irradiation head. As illustrated in FIG. 16, when the electrolyte membrane 12 is irradiated with a laser beam, the irradiated portion is heated to a high temperature and at the same time the peripheral portions are also heated by heat conduction to increase the temperature more gently than the irradiated portion. Therefore, the two local heating steps can be performed by adjusting the laser beam irradiation range in which the temperature near the center of the laser beam is equal to or greater than the second temperature; and the relative movement speed between the laser beam irradiation processing head. HD and the electrolyte membrane 12. In this case, like the temperature profile illustrated in FIG. 17, the length of the period of the first local heating step 1st and the first temperature increase rate can be adjusted by changing a temperature profile fast in which the relative movement speed of the laser beam irradiation processing head HD is fast, to a temperature profile slow in which the relative movement speed of the same is low.

Further, instead of performing laser beam irradiation twice as described above, another method may be configured to implement the second local heating step by performing laser beam irradiation once after as the first local heating step, a heating wire or the like is brought close to a portion to be the interconnector part 30 to sufficiently remove moisture in the portion.

Note that as illustrated in FIG, 4, the method of first stacking the catalyst layer 16 and the protection layer 14 and then forming the dividing grooves 17 can easily form the electrode regions and thus is suitable for continuous roll-to-roll manufacturing.

Figure 18:
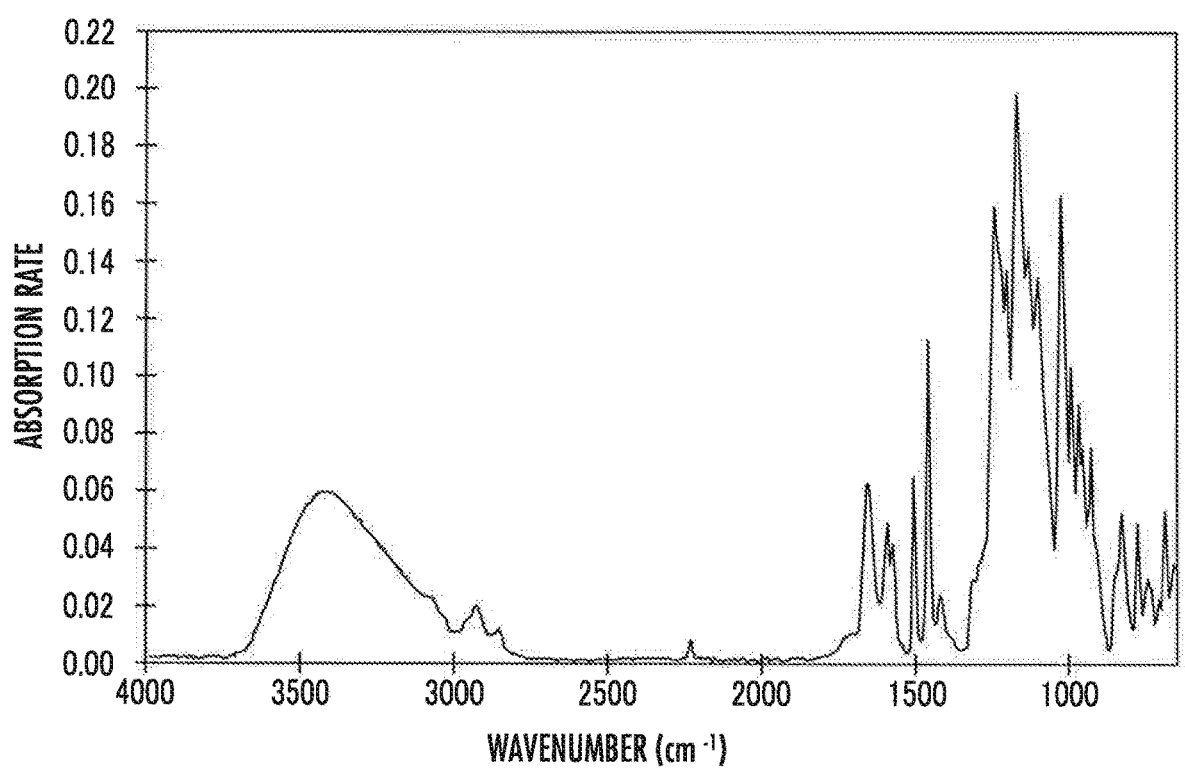
FIG. 18 is a view illustrating an FT-IR spectrum before aromatic polymers are heated.
Figure 19:
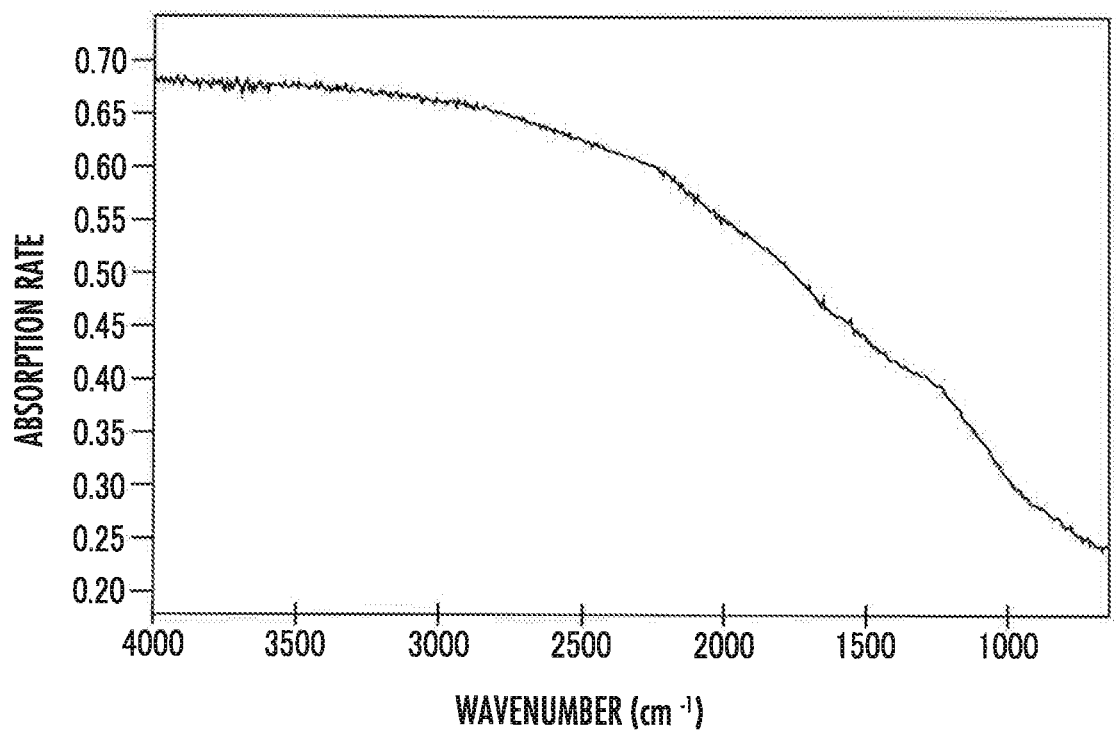
FIG. 19 is a view illustrating an FT-IR spectrum after aromatic polymers are heated.

Here, the measurement results of Fourier Transform infrared Spectroscopy (FT-IR) and Raman spectroscopy of the portion of the interconnector part 30 before the heating and after the heating when an aromatic polymer is used as the proton conductive resin are described. FIGS. 18 and 19 are a view illustrating the FT-IR spectrum before the heating and after the heating respectively. In FIG. 18 before the heating, an absorption line derived from bonding between atoms in the proton conductive resin was observed, while in FIG. 19 after the heating, the absorption line disappeared. The reason for this can be considered that the proton conductive resin was decomposed by heating and changed into a carbonaceous material.

Figure 20:
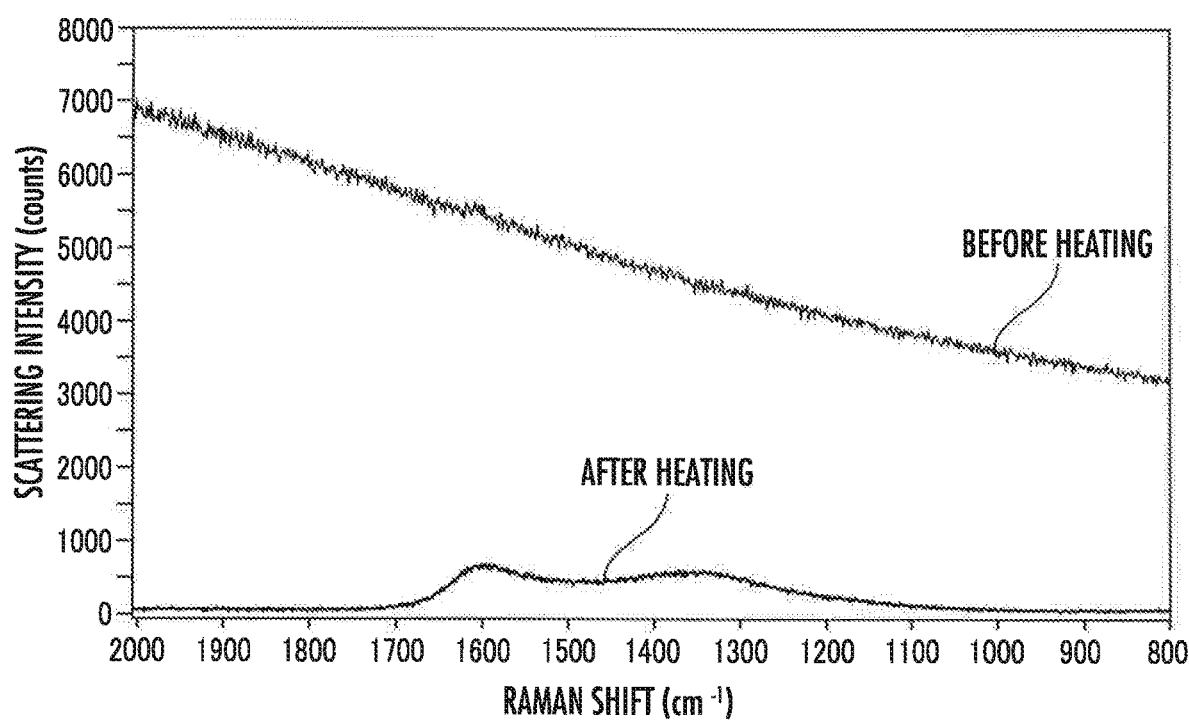
FIG. 20 is a view illustrating a Raman spectrum before and after aromatic polymers are heated.

Meanwhile, it is found from the measurement results of Raman spectroscopy that no peak appeared before the heating, but peaks appeared at the vicinity of 1350 cm$^{-1}$ and 1600 cm$^{-1}$ after the heating (FIG. 20). These are considered to be the D band and the G band respectively, derived from a carbonaceous material, and it is considered that the relevant portions were changed into carbonaceous materials by the heating.

As described above, conductivity having a volume resistivity of about 0.1 Ωmm can be easily imparted to the relevant portion by carbonizing the proton conductive resin by heating.

REFERENCE SIGNS LIST 10 fuel cell
12 electrolyte membrane
14 protection layer
16 catalyst layer
17 dividing groove
18 gas diffusion layer
20 upper plate
22 lower plate
24 seal
26 graphite sheet
28 conducting wire
29a first laser beam irradiation head
29b second laser beam irradiation head
30 interconnector part
HD laser beam irradiation processing head

The invention claimed is:

1. A fuel cell manufacturing method of manufacturing a fuel cell comprising an electrode layer on two surfaces of an electrolyte membrane made of a proton conductive resin, wherein
the electrode layer on the two surfaces includes a plurality of electrode regions divided by a dividing groove; and a unit cell is constituted by a stacked structure including one electrode region on one surface side of the two surfaces, one electrode region on the other surface side facing the one electrode region, and the electrolyte membrane;
a plurality of the unit cells are arranged;
the electrolyte membrane includes therein an interconnector part electrically connecting the electrode region on the one surface side of one of the unit cells and the electrode region on the other surface side of a unit cell arranged adjacent to the one of the unit cells; and
the interconnector part is made of a conductive carbide derived from the proton conductive resin of the electrolyte membrane, wherein
the interconnector part is formed through a local heating process of carbonizing the proton conductive resin by locally heating the electrolyte membrane; and
the local heating process comprises:
a first heating step of heating a part of the electrolyte membrane by laser beam irradiation to a temperature equal to or less than a first temperature as a non-carbonizing temperature for the part of the electrolyte membrane at a first temperature increase rate or less for evaporating moisture in the part of the electrolyte membrane; and
a second heating step of heating the part of the electrolyte membrane by laser beam irradiation after the first heating step to a temperature equal to or greater than a second temperature as a carbonizing temperature for the part of the electrolyte membrane higher than the first temperature at a temperature increase rate for carbonization of the part of the electrolyte membrane greater than the first temperature increase rate,
wherein the first temperature increase rate is 3° C/msec, the first temperature is 400° C., and the second temperature is 900° C.

2. The fuel cell manufacturing method according to claim 1, wherein in the first heating step, the electrolyte membrane is irradiated with a laser beam at a first irradiation intensity, and in the second heating step, the electrolyte membrane is irradiated with a laser beam at a second irradiation intensity higher than the first irradiation intensity.

3. The fuel cell manufacturing method according to claim 1, wherein the proton conductive resin is an aromatic polymer.

4. A processing device forming an interconnector part of a fuel cell comprising: an electrode layer on two surfaces of an electrolyte membrane made of a proton conductive resin, wherein the electrode layer on the two surfaces includes a plurality of electrode regions divided by a dividing groove; a unit cell is constituted by a stacked structure including one electrode region on one surface side of the two surfaces, one electrode region on the other surface side facing the one electrode region, and the electrolyte membrane, wherein a plurality of the unit cells are arranged; the electrolyte membrane includes therein an interconnector part electrically connecting the electrode region on the one surface side of one of the unit cells and the electrode region on the other surface side of a unit cell arranged adjacent to the one of the unit cells; and the interconnector part is made of a conductive carbide derived from the proton conductive resin of the electrolyte membrane,
the processing device comprising a processing head relatively moving along a main surface of the electrolyte membrane, wherein
the processing head comprises: a first laser beam irradiation head configured to heat a part of the electrolyte membrane to a temperature equal to or less than a first temperature as a non-carbonizing temperature for the part of the electrolyte membrane at a first temperature increase rate or less for evaporating moisture in the part of the electrolyte membrane by laser beam irradiation; and a second laser beam irradiation head configured to heat the part of the electrolyte membrane to a temperature equal to or greater than a second temperature as a carbonizing temperature for the part of the electrolyte membrane higher than the first temperature at a temperature increase rate for promoting carbonization of the part of the electrolyte membrane greater than the first temperature increase rate by laser beam irradiation,
wherein the first temperature increase rate is 3° C/msec, the first temperature is 400° C., and the second temperature is 900° C.

* * * * *